United States Patent Office 3,389,200
Patented June 18, 1968

3,389,200
PROCESS FOR PRODUCING COMPRESSED
VERMICULAR GRAPHITE STRUCTURES
Franciszek Olstowski, Freeport, and John D. Watson, Sr., and Oliver Osborn, Lake Jackson, Tex., assignors to The Dow Chemical Company, Midland, Mich., a corporation of Delaware
No Drawing. Filed Mar. 30, 1966, Ser. No. 538,605
9 Claims. (Cl. 264—105)

This invention relates to an improved graphite structure suitable as anodes and to a method for preparing such structures and more particularly relates to a method for preparing anodes from compressed vermicular graphite which show special utility for use as anodes in the electrolysis of aqueous solutions.

Graphite anodes presently employed in aqueous electrolytic processes are usually prepared by the Acheson process wherein coke is blended with a char-producing organic binder to yield a shaped mass and such mass is heated to above 2000° C. to decompose the organic binder and to cause graphitization. Anodes prepared in this manner are generally porous and highly susceptible to oxidation. Therefore, most of such anodes are impregnated with a material such as an organic resin to improve their strength and decrease wear and oxidation rates. Such impregnated anodes still oxidize at an undesirably high rate, however, and they are very brittle and are extremely sensitive to pH. An increase in pH of the aqueous solution being electrolyzed rapidly increases the wear rate of the graphite anodes due to oxidation.

It is an object of this invention to provide an improved graphite structure suitable as an anode for the electrolysis of aqueous solutions. Another object is to provide a process for producing such structures which is rapid and economical and which produces a structure which, when employed as an anode, is non-brittle and has greatly improved characteristics in the electrolysis of aqueous solutions. A further object is to provide an improved process for electrolyzing aqueous solutions by employing improved anodes therein. These and other objects and advantages of the present invention will become obvious from a reading of the following detailed description.

It has now been discovered that an improved graphite structure suitable as an anode for the electrolysis of aqueous solution may be prepared by compressing vermicular graphite along the proper axes to the necessary densities. The structures thus produced have a relatively high density, are non-brittle, have high electrical conductivity, low oxidation rates, little or no porosity and show low free halogen anodic overvoltages and greatly reduced sensitivity to pH of the solution being electrolyzed. Each of these properties is significant in aqueous salt electrolysis and such properties have not heretofore been obtainable in graphite anodes.

The vermicular graphite employed to prepare the structures herein is a compressible form of graphite prepared by introducing an intercalating agent between the laminae of natural or synthetic graphite and expanding such treated graphite by heating to a temperature above about 200° C. and usually above 500° C. For example, a heat-expandable graphite may be prepared by contacting graphite particles with an intercalating agent such as fuming nitric acid, fuming sulfuric acid, mixtures of concentrated nitric and sulfuric acids, perhaloacids, or the like. The treated graphite particles may then be washed free of excess intercalating agent and dried if desired. The resulting treated graphite may be expanded in volume from about 20 to about 600 times by heat, e.g. with a propane flame. Such expanded graphite is usually in low bulk density, particulate, worm-like form and is easily malleable and compressible into shaped monolithic structures.

Compression of such expanded vermicular graphite along a single axis (uniaxially) will produce a compact integral structure having high electrical and thermal anisotropy. Both electrical and thermal resistivity are highest in the direction of compression and lowest in the direction perpendicular to that of compression. The anisotropy ratio of such compressed structures increases with increasing compression up to or near the theoretical density of the graphite. Compression of vermicular graphite in two orthogonal directions (biaxially) substantially reduces the anisotropic properties of the compressed structure. Compression of vermicular graphite triaxially (3-dimensional orthogonal compression) or isostatically also produces compacts having little or no anisotropy.

The structures of this invention are prepared by compressing vermicular graphite to a relatively high density, either by compression biaxially or by biaxial compression followed by isostatic compression. Uniaxial compression produces a structure having good electrical and oxidation characteristics but, when employed as an anode, such structures may tend to partially swell in the direction parallel to the axis of compression during use and care must be exercised to assure that such swelling does not narrow the distance between electrodes. Therefore, the improved structures of this invention are produced from vermicular graphite by compressing a mass of such graphite along one axis with a compression force sufficient to produce a density of such graphite from about 0.2 gm./cc. to about 1.0 gm./cc. and then compressing such compact along an axis which is at right angles to the first compression axis with a compression force sufficient to produce a graphite density of at least 1.4 gm./cc. and preferably a density between about 1.7 gm./cc. and 2.0 gm./cc. These densities are usually achieved by applying pressures of from about 10,000 p.s.i. to about 20,000 p.s.i. Once the compact has been biaxially compressed to a density of about 1.4 gm./cc. or more, the final compression to a higher density may be accomplished by applying isostatic force to the compact. Such isostatic compression produces little or no compaction along any previously uncompacted axis. Compaction therefore continues along the axes of original compression.

Improved mechanical properties may be imparted to such compressed vermicular graphite structures by blending a solid organic or inorganic bonding agent with the vermicular graphite prior to compression. Ordinarily, the organic or inorganic bonding agent is employed in the form of a fine powder, e.g., from 100 to 325 mesh in an amount of from about 1 weight percent to about 25 weight percent, preferably from about 2 weight percent to about 15 weight percent. Amounts of bonding agent less than about 1 weight percent provide little or no improvement in the physical characteristics of the structure and amounts greater than about 25 weight percent begin to adversely affect the electrical conductivity. It can be readily understood the specific density of the additive will affect the apparent bulk density of the compact. For instance, if the density of the additive is 1 gm./cc., the apparent bulk density of the compact cannot as closely approach a value of 2.1 gm./cc. as when no additive is employed.

Examples of suitable bonding agents include cured thermoplastic resins and curable thermosetting resins such as polyethylene, ethylene-propylene copolymers, polyamides, polyesters, polyphenylene-sulfides, epoxy resins, polyurethane resins, fluorinated polymers such as polytetrafluoroethylene, phenol-formaldehyde resins, and the like which have included therein any necessary catalyst or crosslinker. Organic char yielding materials such as pitches and tars and vitreous materials which include glasses and the inorganic glass-forming oxides such as boric oxide, silica, germanium oxide, and the like may also be employed. When char-forming organic materials, vitreous materials or thermoplastics are used as bonding agents, it is necessary, of course, to heat the compressed compact sufficiently to cause fusion of the bonding agent.

Structures prepared according to this invention, whether or not containing a bonding agent, are useful as anodes in any of the aqueous electrolytic processes presently employing graphite anodes. These include diaphragm and mercury cells for the electrolysis of brine to produce chlorine and caustic; chlorate cells; bromate cells; electrolysis of $NaSO_4$ to produce $NaOH$ and $H_2SO_4$; fluorination cells; and cells to produce hydrogen and oxygen.

It has been found that anodes prepared in accordance herewith show anode wear rates of from ⅘ to less than ½ of the wear rate of the best commercially available graphite anodes in an acid medium and about ⅓ the wear rate of commercial anodes in a highly basic medium thereby indicating both a substantially reduced wear rate and a greatly decreased sensitivity to the pH of the solution being electrolyzed. Likewise, the commercial electrographite used for anodes has an electrical specific resistance of about 350 microhm-inches whereas anodes prepared from vermicular graphite by the process herein usually have specific resistances between about 150 microhm-inches and 250 microhm-inches.

An additional advantage possessed by the anodes prepared in accordance with this invention, particularly when such anodes are employed in chlorine cells, is a lower chlorine overvoltage. Improvements of as much as 250 millivolts have been found.

The following examples are meant to more fully illustrate the invention but are not to be construed as limiting to the scope thereof.

EXAMPLE 1.—ANODE PREPARATION

Anode A: Uniaxially compressed

Vermicular graphite of an apparent bulk density of about 0.005 gm./cc. was compressed under a force of 11,000 p.s.i. along one axis to a density of about 1.89 gm./cc. The compact had a specific resistance of 131 microhm-inches in the plane perpendicular to that of compression.

Anode B: Biaxially compressed

Vermicular graphite of an apparent bulk density of about 0.005 gm./cc. was compressed along one axis to a density of about 0.2 gm. 1 cc., then was compressed along an axis perpendicular to the first compression axis to a density of about 1.85 gm./cc. The compact thus produced had a specific resistance in the plane parallel to the first compression axis of 606 microhm-inches and in the plane parallel to the uncompressed axis (i.e. the direction orthogonal to the two compression vectors) of 150 microhm-inches.

Anode C: Biaxially compressed anode containing an epoxy resin binder

Vermicular graphite of an apparent bulk density of about 0.005 gm./cc. was blended with fine powdery epoxy resin powder (a heat-curable commercial epoxy formulation). The ratio of graphite to epoxy powder was 85/15 parts by weight. The blending was done by carefully tumbling the mixture so as to avoid excessive breaking-up of the vermicular graphite.

The mixture was compressed along one vector to a density of about 0.2 gm./cc. and then along a vector perpendicular to the first compression vector to a density of about 1.85 gm./cc.

The epoxy in the compact was cured by heating the compact to 400° F. and then it was allowed to cool.

The compact had a specific resistance in the uncompressed vector (i.e. the direction orthogonal to the two compression vectors) of 226 microhm-inches.

Anode D: Biaxially compressed anode containing a polyethylene binder 90 parts of vermicular graphite of 0.005 gm./cc. apparent bulk density was thoroughly blended in a tumbler with 10 parts by weight of fine powdery polyethylene (−200 Standard Sieve Size). The procedure followed in making Anode C above was followed, including the 400° F. heat treatment.

The compact had a specific resistance in the uncompressed vector of about 200 microhm-inches.

Anode E: Biaxially compressed anode containing a phenol-formaldehyde resin as a binder The procedure followed in making Anode C above was followed, except that 15 parts by weight of a fine powdery phenol-formaldehyde resin was blended with 85 parts by weight of the vermicular graphite. The final compact had a specific resistance in the uncompressed vector of about 268 microhm-inches.

Anode F: Biaxially compressed anode containing pyrolyzed pitch as a binder

The procedure followed in making Anode C above was followed except that 5 parts by weight of a fine powdery commercially-available pitch was blended with 95 parts by weight of the vermicular graphite and the heating cycle was done by increasing the temperature at the rate of 8°/hour to 500° C., then heating rapidly to about 950° C., then coolingg. All the heating was done with the compact in a non-oxidizing atmosphere. The heating caused pyrolysis of the pitch to yield a carbon-bonded structure.

The structure had a specific resistance in the uncompressed vector of about 161 microhm-inches and a final density of 1.72 gm./cc.

Anode G: Uniaxially compressed anode containing powdered pitch 80 parts of vermicular graphite having an apparent bulk density of about 0.005 gm./cc. was blended in a tumbler with 20 parts by weight of a fine powdery commercially-available pitch.

The mixture was uniaxially compressed to a density of about 1.76 gm./cc. and then was heated to pyrolyze the pitch in the same manner as shown in the procedure for Anode F above.

The compact had a specific resistance in the plane perpendicular to the compression vector of 187 microhm-inches and had a final density of 1.6 gm./cc.

EXAMPLE 2

An experiment was conducted wherein three anodes of different composition were employed in diaphragm chlorine cells which were otherwise identical. The electrographite anode was a standard commercial anode made of Acheson process polycrystalline graphite impregnated with linseed oil. Anode B was biaxially compressed vermicular graphite having a density of 1.85 gm./cc. Anode No. C was composed of biaxially compressed vermicular graphite having a density of 1.85 gm./cc. and containing 15 percent by weight of epoxy resin as a binder. Such anodes were placed in laboratory scale chlorine cells utilizing carbon cathodes and used for electrolyzing a saturated NaCl solution. The cells were operated at 75–85° C., an anolyte pH of 2.0–2.5, and an anode current density of 1 amp per square inch. Chlorine was produced at the anode and $H_2$ and NaOH were produced at the cathode. As necessary, $H_2O$, NaCl and HCl were fed to the cells to maintain electrolyte level, salinity and anolyte pH.

After 225 days of continuous operation, the anodes were removed from the cells, washed in distilled water for 72 hours, dried at 70–100° C., rewashed, redried and weighed. The anodes were found to have the following weight-loss rate:

| Run | Anode Composition | Wt. Loss Rate, gm./day/ampere |
|---|---|---|
| Control | Electrographite | 0.030 |
| 1 | Anode B | 0.024 |
| 2 | Anode C | 0.920 |

EXAMPLE 3

In essentially the same manner as Example 1, another group of anodes were inserted into laboratory scale chlorine cells and operated for 78 days. At the end of this period, the anodes were washed, dried, weighed, reinserted in the cells and operated for an additional 121 days. The anodes were then again washed, dried and weighed. The following weight loss rates were observed:

| Run | Anode Composition | Wt. Loss Rate, gm./day/ampere | |
|---|---|---|---|
| | | 78 days | 199 days |
| Control | Electrographite impregnated with a phenol-formaldehyde resin. | 0.052 | 0.064 |
| 1 | Electrographite impregnated with linseed oil. | 0.045 | 0.043 |
| 2 | Vermicular graphite biaxially compressed to a density of ~1.85 gms./cc. containing 10 wt. percent polyethylene as a binder prepared as in Example 1D. | 0.029 | 0.034 |
| 3 | Vermicular graphite biaxially compressed to a density of ~1.75 gm./cc. and containing 15 wt. percent phenolformaldehyde resin as a binder prepared as in Example 1E. | 0.038 | 0.034 |
| 4 | Vermicular graphite biaxially compressed to a density of ~1.72 gm./cc. bonded with 5 wt. percent of commercial pitch and pyrolyzed as in Example 1F. | | 0.035 |

EXAMPLE 4

In order to determine the effect of various concentrations of bonding agent upon the characteristics of the compressed vermicular graphite anodes, vermicular graphite, having an apparent bulk density of less than 0.5 lbs./ft.$^3$ (~0.008 gm./cc.) was blended with powdered phenol-formaldehyde resin in concentrations of 2.5, 5 and 10 weight percent. Each batch of the blended mass was uniaxially compressed in a rectangular mold to a density of 0.2 gm./cc. and then compressed at right angles to the original axis of compression under a force of 10,000 p.s.i. to produce a biaxially compressed anode structure. Such anodes were then heated to 400° F. to fuse the binder. These anodes and an anode made of standard resin impregnated commercial graphite were then used to electrolyze brine in the same manner as Example 2. Weight loss rates were determined on the 55th, 92nd, 130th and 176th days of operation and are shown in the following tabulation:

| Run | Graphite Anode Composition | Weight Loss Rate (gm./day/ampere) | | | |
|---|---|---|---|---|---|
| | | 55th day | 92nd day | 130th day | 176th day |
| Control | Resin Impregnated Commercial Graphite | 0.060 | 0.049 | 0.045 | 0.041 |
| 1 | Compressed Vermicular Graphite with 2.5% Binder | 0.025 | 0.025 | 0.029 | 0.029 |
| 2 | Compressed Vermicular Graphite with 5% Binder | 0.018 | 0.021 | 0.024 | 0.024 |
| 3 | Compressed Vermicular Graphite with 10% Binder | | 0.017 | 0.024 | 0.026 |

EXAMPLE 5

A volume of vermicular graphite having a density of about 0.009 gm./cc. (0.54 lbs./ft.$^3$) was mixed with 10% by weight of −325 mesh polyethylene powder, compressed along one axis to a density of 0.2 gm./cc. and then compressed along an axis perpendicular to the first axis under a force of 6250 p.s.i. to yield an anode measuring 4″ × 4″ × ⅜″. The anode was then heated to 200° C. for about 30 minutes to fuse the polymer and produce an anode having a density of 1.78 gm./cc. For purposes of comparison, an identically sized anode was cut from a standard resin-impregnated commercial electrographite chlorine cell anode. Such anodes were then assembled into small prototype asbestos diaphragmed chlorine cells employing mild steel cathodes. Spacing between the anodes and the diaphragm was set at 0.25 inch, the cells were electrically connected in series and fed a concentrated (about 305 gm./l.) NaCl brine solution. The temperature within the cells was maintained between 70–75° C. and a current of 8 amps was applied to produce an anode current density of about 0.5 amp./in.$^2$. At various times during operation of the cells, analysis by a modified Orsat technique for chlorine and $CO_2$ was made of the anode gases from the cells. The $CO_2$ analysis is a relative indication of the oxidation rate of the graphite. The results were as follows:

| Run | Anode Composition | Days of Operation | | |
|---|---|---|---|---|
| | | 8 | 12 | 15 |
| Control | Commercial Electrographite: | | | |
| | Vol. percent $Cl_2$ | 98.04 | 92.88 | 95.74 |
| | Vol. percent $CO_2$ | 1.88 | 3.88 | 2.43 |
| 1 | Polyethylene Bonded Compressed Vermicular Graphite: | | | |
| | Vol. percent $Cl_2$ | 98.42 | 97.08 | 96.49 |
| | Vol. percent $CO_2$ | 1.67 | 2.00 | 2.14 |

EXAMPLE 6

In order to demonstrate the improvement in chlorine overvoltage when compressed vermicular graphite anodes are employed, compressed vermicular graphite anodes of various compositons were tested in direct comparison with pyrolytic graphite and standard electrographite. Each anode tested was masked with epoxy resin so that only 1 square inch of active face area was exposed to the electrolyte. Such blocks were then immersed in a saturated brine solution at a temperature of 65° C. and a pH of 1.5. A carbon cathode was employed and current passed through each cell to produce an anode current density of 1 amp./in.$^2$ of exposed face. A saturated calomel reference cell containing a capillary tip was placed adjacent to the anode during electrolysis to determine the chlorine overvoltages of the various graphites. The observed half cell potentials were as follows:

| Run | Anode Composition | Anode Potential (Volts) |
|---|---|---|
| 1 | Compressed Vermicular Graphite bonded with 10 wt. percent polyethylene. | 1.465 |
| 2 | Compressed Vermicular Graphite with no bonding agent. | 1.440 |
| Control | Electrographite (resin impregnated) | 1.700 |
| Do | Electrographite, not impregnated | 1.600 |
| Do | Pyrolytic Graphite, not impregnated | 1.550 |

EXAMPLE 7

Anodes prepared in accordance with the procedures shown in Example 1 for similar anodes were compared with commercially available electrographite anodes in electrolysis of alkaline electrolytes. Anodes of identical size were used to electrolyze saturated brine solutions having a pH of 10.0 to 10.5. The immersed graphite area of each anode was 1.33 square inches, all the anodes tested were connected in series with the other cells and mild steel cathodes were employed. The results of such tests are summarized as follows:

| Run | Anode Composition | Anode Weight Loss (gms.) | Length of Run, (hrs.) | Cell Temp., °C. | Anode Current Density, amps./in.² |
|---|---|---|---|---|---|
| 1 | Compressed Vermicular Graphite bonded with 15 wt. percent polyethylene. | 2.17 | 432 | 60 | 1.5 |
| 2 | Compressed Vermicular Graphite bonded with 25 wt. percent polyethylene. | 2.25 | 442 | 60 | 1.5 |
| 3 | Compressed Vermicular Graphite bonded with 35 wt. percent polyethylene. | 3.22 | 432 | 60 | 1.5 |
| Control | Electrographite, resin filled | 4.23 | 432 | 60 | 1.5 |
| 4 | Biaxially compressed vermicular graphite, no binder. | 0.52 | 163 | 90 | 0.75 |
| 5 | Compressed Vermicular Graphite bonded with 15 wt. percent phenolformaldehyde resin. | 1.01 | 163 | 90 | 0.75 |
| 6 | Compressed Vermicular Graphite bonded with 15 wt. percent polyethylene. | 0.52 | 163 | 90 | 0.75 |
| Control | Electrographite, resin filled | 1.62 | 163 | 90 | 0.75 |
| Do | Electrographite, linseed oil filled | 2.36 | 163 | 90 | 0.75 |
| 7 | Uniaxially compressed vermicular graphite bonded with 20 wt. percent pitch (pyrolyzed). | 0.81 | 242 | 70 | 1.5 |
| Control | Electrographite, resin filled | 1.63 | 242 | 70 | 1.5 |

EXAMPLE 8

Electrodes with a further reduced tendency to swell when used in chlorine cell electrolysis were prepared by performing the biaxial compression in a sequence of interrupted compression stages.

A quantity of vermicular graphite of an apparent bulk density of 0.005 gm./cc. was compressed along a first axis to a density of 0.1 gm./cc., then along the second axis (perpendicular to the first axis) to a density of 0.2 gm./cc. The compact thus produced was then compressed again along the first axis to a density of 0.4 gm./cc., then along the second axis to a density of 0.8 gm./cc., and along the first axis to a final density of 1.6 gm./cc. The third axis orthogonal to the aforenamed first and second axes did not receive any compression force, thus it was the direction of greatest electrical and thermal conductivity.

This electrode exhibited less swelling in the direction of greatest swelling than did electrodes prepared either by uniaxial compression or the 2-step biaxial compression shown in previous examples.

Various modifications can be made in the present invention without departing from the spirit or scope thereof for it is understood that we limit ourselves only as defined in the appended claims.

We claim:

1. A process for producing compressed vermicular graphite structures suitable for electrodes in electrolysis of aqueous solutions which comprises
   (a) compressing vermicular graphite along one axis to a density of about 0.2 gm./cc. to about 1.0 gm./cc. to form a compact, and
   (b) compressing said compact along an axis perpendicular to the original compression axis to a density of at least 1.4 gm./cc.

2. The process of claim 1 wherein the vermicular graphite has an initial density of less than 0.05 gm./cc.

3. The process of claim 1 wherein the final density is between about 1.7 gm./cc. and about 2.0 gm./cc.

4. The process as defined in claim 1 and including the steps of compressing said compact along an axis perpendicular to the original compression axis to a density of about 1.4 gm./cc. and isostatically compressing the structure thus formed to a density of between about 1.7 gm./cc. and about 2.0 gm./cc.

5. The process of claim 1 wherein the vermicular graphite is blended with from about 1 to about 25 weight percent of a bonding agent.

6. The process of claim 1 wherein the vermicular graphite is blended with from about 1 to about 25 weight percent of a thermally activatable bonding agent and including the step of heating the finally compressed structure to activate said bonding agent.

7. The process of claim 5 wherein the bonding agent is polyethylene.

8. The process of claim 5 wherein the bonding agent is phenol-formaldehyde resin.

9. A process for producing compressed vermicular graphite structures suitable for electrodes in the electrolysis of aqueous solutions which comprises,
   (a) compressing vermicular graphite along one axis to form a compact thereof,
   (b) compressing such compact along an axis perpendicular to the original compression axis to form a more dense compact, and
   (c) sequentially repeating steps (a) and (b) until said compact has a density of at least 1.4 gm./cc.

References Cited

UNITED STATES PATENTS

| | | | |
|---|---|---|---|
| 1,137,373 | 4/1915 | Aylsworth | 23—209.1 |
| 1,191,383 | 7/1916 | Aylsworth | 23—209.1 |
| 2,799,051 | 7/1957 | Coler et al. | 252—511 XR |
| 2,997,744 | 8/1961 | Stoddard et al. | 204—294 XR |
| 3,325,325 | 6/1967 | Ward | 117—226 |
| 3,357,929 | 12/1967 | Olstowski | 23—209.1 |

HOWARD S. WILLIAMS, *Primary Examiner.*

D. R. JORDAN, *Assistant Examiner.*